(12) United States Patent
Ota

(10) Patent No.: US 9,885,840 B2
(45) Date of Patent: Feb. 6, 2018

(54) OPTICAL TRANSMISSION CONNECTOR DEVICE

(71) Applicant: Olympus Corporation, Hachioji-shi, Tokyo (JP)

(72) Inventor: Ryu Ota, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/630,656

(22) Filed: Jun. 22, 2017

(65) Prior Publication Data

US 2017/0285278 A1 Oct. 5, 2017

Related U.S. Application Data

(63) Continuation of application No. PCT/JP2015/080717, filed on Oct. 30, 2015.

(30) Foreign Application Priority Data

Dec. 25, 2014 (JP) .................................. 2014-262879

(51) Int. Cl.
G02B 6/38 (2006.01)
G02B 23/26 (2006.01)
G02B 6/32 (2006.01)

(52) U.S. Cl.
CPC ............ *G02B 6/3885* (2013.01); *G02B 6/32* (2013.01); *G02B 23/26* (2013.01)

(58) Field of Classification Search
CPC ......... G02B 6/3885; G02B 23/26; G02B 6/32
See application file for complete search history.

(56) References Cited

U.S. PATENT DOCUMENTS 6,289,152 B1 * 9/2001 Zhang ................. G02B 6/2817
  359/281
6,438,290 B1 * 8/2002 Bietry ....................... G02B 3/04
  385/31

(Continued)

FOREIGN PATENT DOCUMENTS

JP 56150714 A 11/1981
JP 59084511 U 6/1984

(Continued)

OTHER PUBLICATIONS

International Search Report (ISR) dated Jan. 26, 2016 issued in International Application No. PCT/JP2015/080717.

*Primary Examiner* — Ryan Lepisto
(74) *Attorney, Agent, or Firm* — Holtz, Holtz & Volek PC

(57) ABSTRACT

An optical transmission connector device includes: a transmission-side connector sending optical signals; and a reception-side connector receiving the optical signals sent from the transmission-side connector. The transmission-side and the reception-side connectors have: optical fibers transmitting optical signals; and optical members disposed in contact with or in the vicinity of one end surfaces of the optical fibers. The optical member of the transmission-side connector is formed so as to convert the optical signals emitted from the one end surfaces of the optical fibers into approximately parallel beams of light and so as to cause the centers of light beams of the approximately parallel beams of light to intersect at approximately one point. The optical member of the reception-side connector is formed so as to cause the optical signals converted into the approximately parallel beams of light at the optical member of the transmission-side connector to enter the separate optical fibers.

1 Claim, 7 Drawing Sheets

(56) References Cited

U.S. PATENT DOCUMENTS

| | | | |
|---|---|---|---|
| 6,635,861 B1 | 10/2003 | Stone | |
| 7,446,298 B1 | 11/2008 | Stone | |
| 7,660,502 B1 | 2/2010 | Stone | |
| 7,813,603 B2* | 10/2010 | Nikolajsen | G02B 6/2817 359/334 |
| 8,182,159 B2* | 5/2012 | Tanaka | G02B 6/2937 385/73 |
| 9,223,091 B2* | 12/2015 | Beresnev | G02B 6/32 |
| 9,557,488 B2* | 1/2017 | DeMeritt | G02B 6/327 |
| 9,645,325 B2* | 5/2017 | Fortusini | G02B 6/3853 |
| 2003/0081897 A1 | 5/2003 | Itoh et al. | |
| 2004/0159777 A1 | 8/2004 | Stone | |
| 2006/0165351 A1 | 7/2006 | Kenjiro et al. | |
| 2006/0249661 A1 | 11/2006 | Yoshiaki et al. | |
| 2013/0028559 A1 | 1/2013 | Shiraishi | |
| 2013/0302032 A1* | 11/2013 | Shimakawa | G02B 6/2937 398/48 |

FOREIGN PATENT DOCUMENTS

| | | |
|---|---|---|
| JP | 2003195012 A | 7/2003 |
| JP | 2004070311 A | 3/2004 |
| JP | 2007127797 A | 5/2007 |
| JP | 2007178790 A | 7/2007 |
| JP | 2008203546 A | 9/2008 |
| JP | 2013029782 A | 2/2013 |

\* cited by examiner

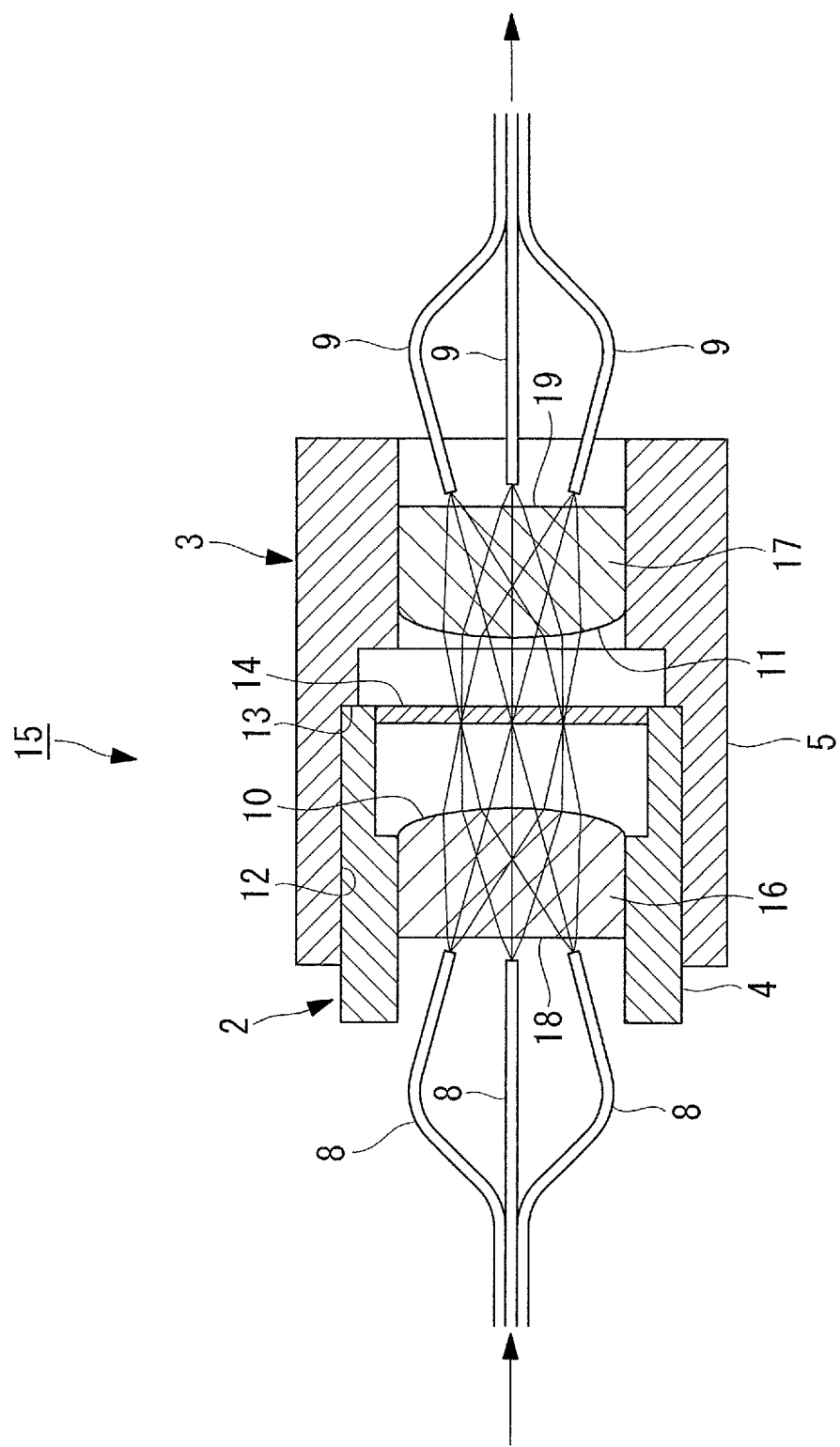

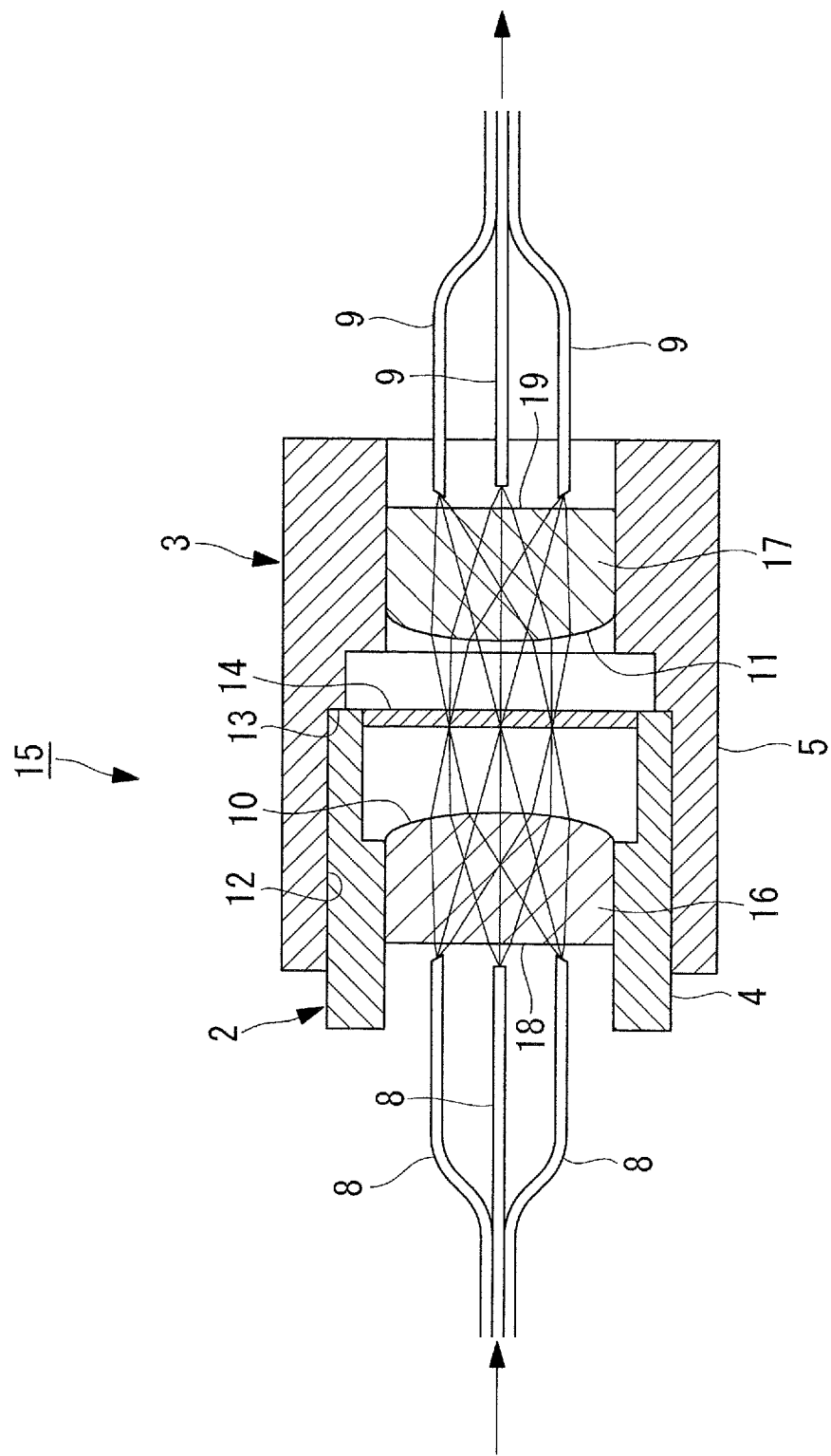

OPTICAL TRANSMISSION CONNECTOR DEVICE

CROSS-REFERENCE TO RELATED APPLICATIONS

This is a continuation of International Application PCT/JP2015/080717, with an international filing date of Oct. 30, 2015, which is hereby incorporated by reference herein in its entirety. This application claims the benefit of Japanese Patent Application No. 2014-262879, the content of which is incorporated herein by reference.

TECHNICAL FIELD

The present invention relates to an optical transmission connector device.

BACKGROUND ART

In various devices provided with an image acquisition device, an image processing device, etc., since the amount of data to be transmitted is increased in association with an increased number of pixels of an image acquisition element, high-speed data transmission/reception is widely performed by using optical transmission media, such as a plurality of optical fibers. Then, when a plurality of optical transmission media are connected to each other or when a plurality of optical transmission media and various optical devices are connected, optical transmission connectors for transmitting/receiving optical signals, which serve as data, are provided at a connecting portion therebetween.

Among such optical transmission connectors, various optical transmission connectors in which lenses are made to have characteristics in order to improve the data transmission efficiency by expanding the light-beam diameters of optical signals from the optical transmission media have been proposed (for example, see PTLs 1 and 2).

PTL 1 discloses an optical connector that collimates optical signals from a plurality of optical propagation paths (optical transmission media), in a lens array in which the same number of resin lenses as the optical propagation paths are arrayed, and that causes the optical signals to be emitted from the lens array to another device.

Furthermore, PTL 2 discloses an optical module in which, between an optical waveguide group having a plurality of optical transmission paths and a photoelectric element group having a plurality of photoelectric elements, a first convex lens that has an effective diameter larger than the distance between the optical axes of the two farthest optical transmission paths and a second convex lens that has an effective diameter larger than the distance between the optical axes of the two farthest photoelectric elements are provided, and optical signals from the optical waveguide group are collimated in the first convex lens and are focused on the photoelectric elements by the second convex lens.

Incidentally, optical transmission connectors are also provided at a connecting portion between a scope and an image processing device in an endoscope system. Then, because there is a fear that foreign matter, water stains, or the like will adhere to optical transmission connector portions at the time of attachment/detachment or cleaning of the scope, thus reducing the transmission efficiency, optical transmission connectors that achieve an improved transmission efficiency by using lenses such as those mentioned above are used. On the other hand, there is a strong demand for size reduction of endoscope systems from the point of view of reducing the burden on patients, and it is preferred that the optical transmission connectors to be applied to endoscope systems be small.

CITATION LIST

Patent Literature

{PTL 1} Japanese Unexamined Patent Application, Publication No. 2007-178790
{PTL 2} Japanese Unexamined Patent Application, Publication No. 2007-127797

SUMMARY OF INVENTION

The present invention provides an optical transmission connector device including: a transmission-side connector that sends a plurality of optical signals; and a reception-side connector that receives the plurality of optical signals sent from the transmission-side connector, wherein the transmission-side connector and the reception-side connector each have: a plurality of optical fibers that transmit the optical signals; and an optical member that is disposed in contact with or in the vicinity of one end surfaces of the plurality of optical fibers; the optical member of the transmission-side connector is formed so as to convert the plurality of optical signals emitted from the one end surfaces of the optical fibers into approximately parallel beams of light and so as to cause the centers of light beams of the approximately parallel beams of light to intersect at approximately one point; the optical member of the reception-side connector is formed so as to cause the plurality of optical signals converted into approximately parallel beams of light at the optical member of the transmission-side connector to enter the separate optical fibers; and the following conditional expression (1) is satisfied;

$$D1/D2 < 2 \qquad (1)$$

where D1 is the maximum effective diameter of the optical member of the transmission-side connector, and D2 is the maximum light-beam diameter of the parallel light.

BRIEF DESCRIPTION OF DRAWINGS

FIG. 6 is a longitudinal sectional view showing an optical transmission connector device according to a second embodiment of the present invention.

FIG. 7 is a longitudinal sectional view showing a modification of the optical transmission connector device shown in FIG. 6.

DESCRIPTION OF EMBODIMENTS

An optical transmission connector device 1 according to a first embodiment of the present invention will be described below with reference to the drawings.

Figure 1:
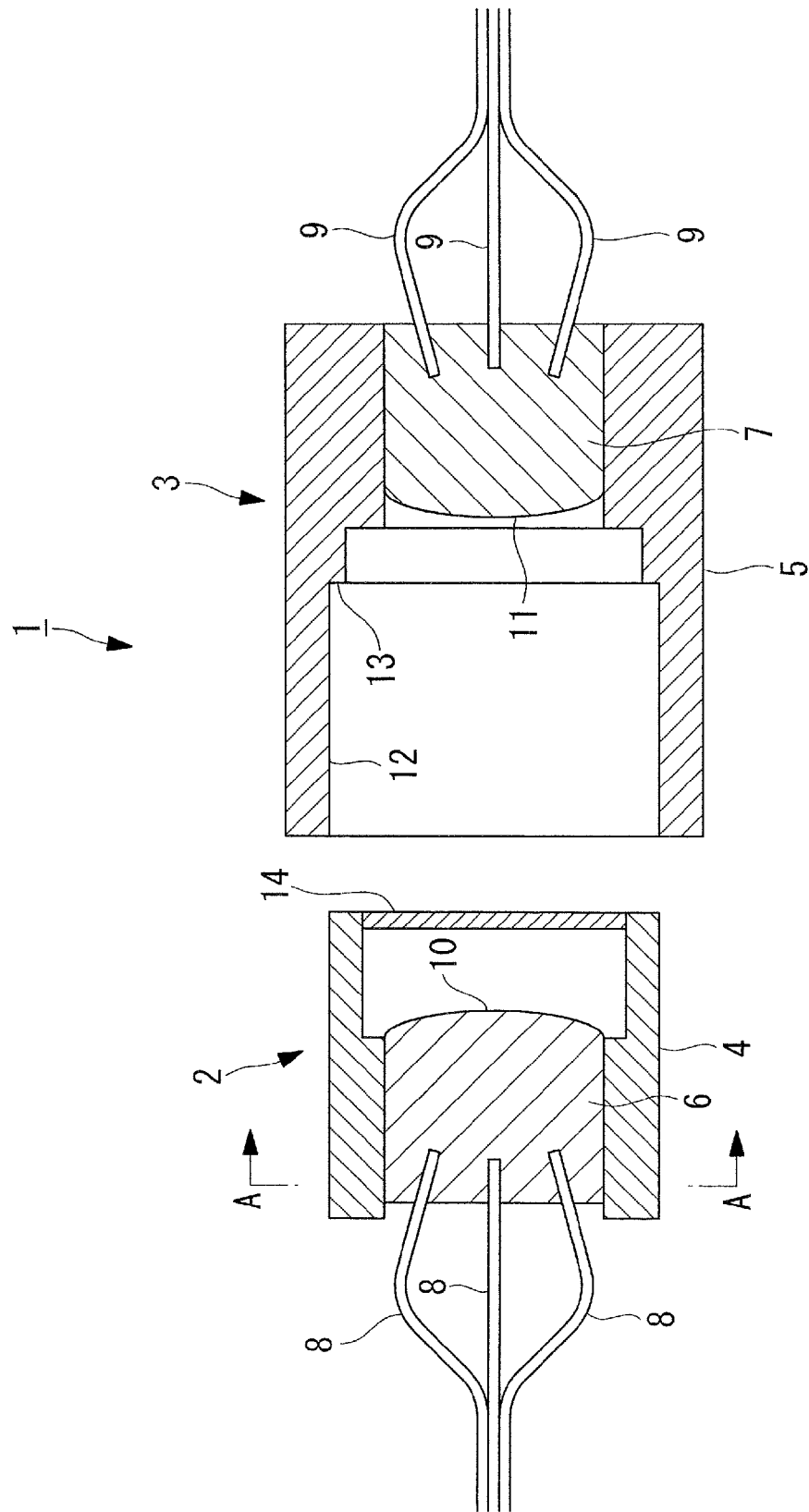
FIG. 1 is a longitudinal sectional view showing an optical transmission connector device according to a first embodiment of the present invention.

As shown in FIG. 1, the optical transmission connector device 1 of this embodiment is provided with a transmission-side connector 2 and a reception-side connector 3.

Figure 2:
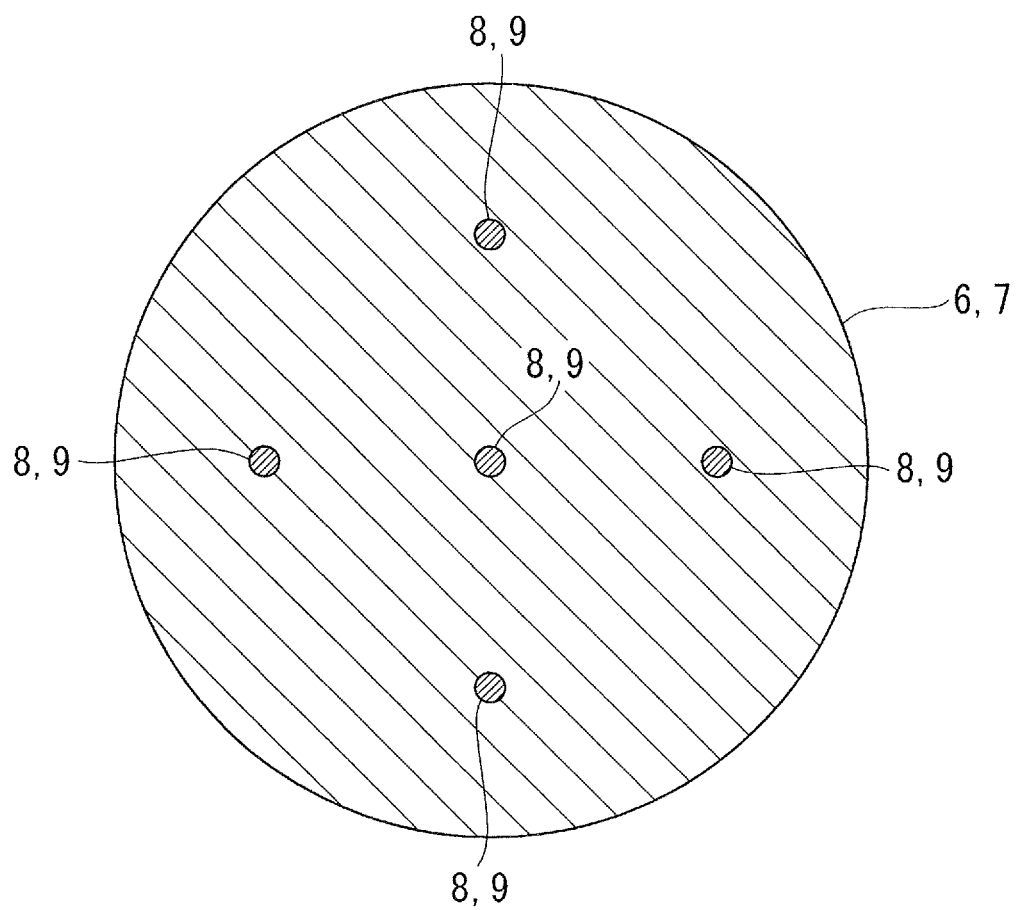
FIG. 2 is a transverse sectional view of a lens of a transmission-side (or reception-side) connector of the optical transmission connector device shown in FIG. 1, viewed along the line A-A in FIG. 1.

The transmission-side connector 2 and the reception-side connector 3 are respectively provided with: housings 4 and 5; lenses (optical members) 6 and 7 that are fixed in the housings 4 and 5; and a plurality of, for example, five, optical fibers 8 and 9, as shown in FIG. 2, one end surfaces of which are fixed to the lenses 6 and 7 (only three optical fibers thereof are shown in FIG. 1). The lenses 6 and 7 have single convex surfaces 10 and 11, respectively.

The convex surfaces 10 and 11 are aspheric surfaces in which power is gradually weakened from the centers of the lenses 6 and 7 toward the peripheries thereof.

The housing 4 of the transmission-side connector 2 and the housing 5 of the reception-side connector 3 are coupled to each other in a detachable manner. The housing 5 of the reception-side connector 3 is provided with a fitting hole 12 into which the housing 4 of the transmission-side connector 2 is fitted and is also provided with an abutting surface 13 against which the housing 4 of the transmission-side connector 2 abuts in the longitudinal direction. Note that the housings 4 and 5 are provided with circumferential positioning means, such as a key and a keyway (not shown), for positioning the housings 4 and 5 in the circumferential direction.

Figure 3:
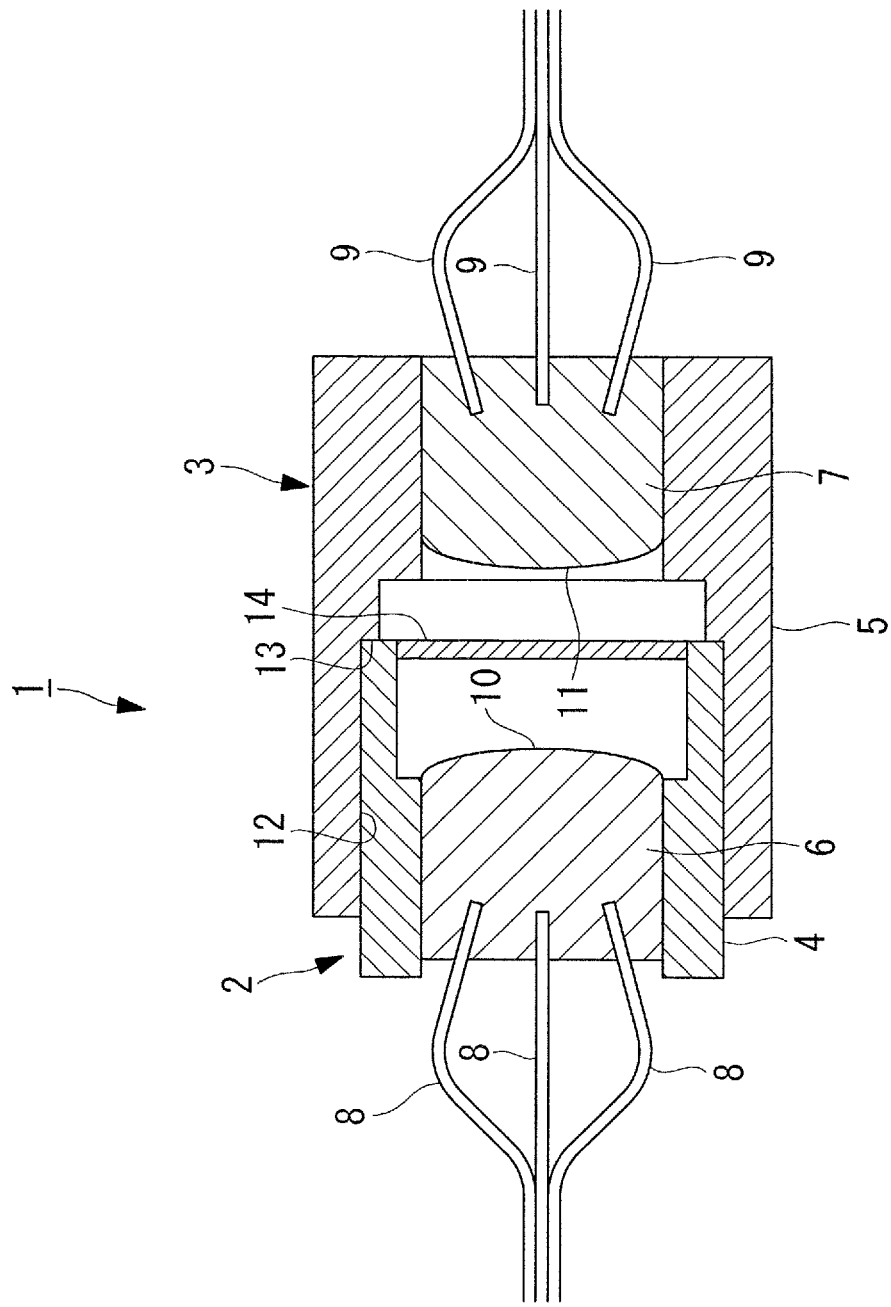
FIG. 3 is a longitudinal sectional view showing a state in which the transmission-side connector and the reception-side connector of the optical transmission connector device shown in FIG. 1 are coupled.

Accordingly, when the housings 4 and 5 are coupled, and the housing 4 of the transmission-side connector 2 abuts against the abutting surface 13 of the housing 5 of the reception-side connector 3, the housings 4 and 5 are positioned in the radial direction and in the longitudinal direction, as shown in FIG. 3. Specifically, when the transmission-side connector 2 and the reception-side connector 3 are coupled, the convex surface 10 of the lens 6 of the transmission-side connector 2 and the convex surface 11 of the lens 7 of the reception-side connector 3 are disposed opposing each other with a predetermined gap therebetween, with the optical axes thereof aligned.

One ends of the optical fibers 8 and 9 are disposed in close contact with the lenses 6 and 7 with no gaps therebetween. The lenses 6 and 7 are formed of transparent resin or glass and have a refractive index equivalent to the refractive index of the cores of the optical fibers 8 and 9.

Figure 4:
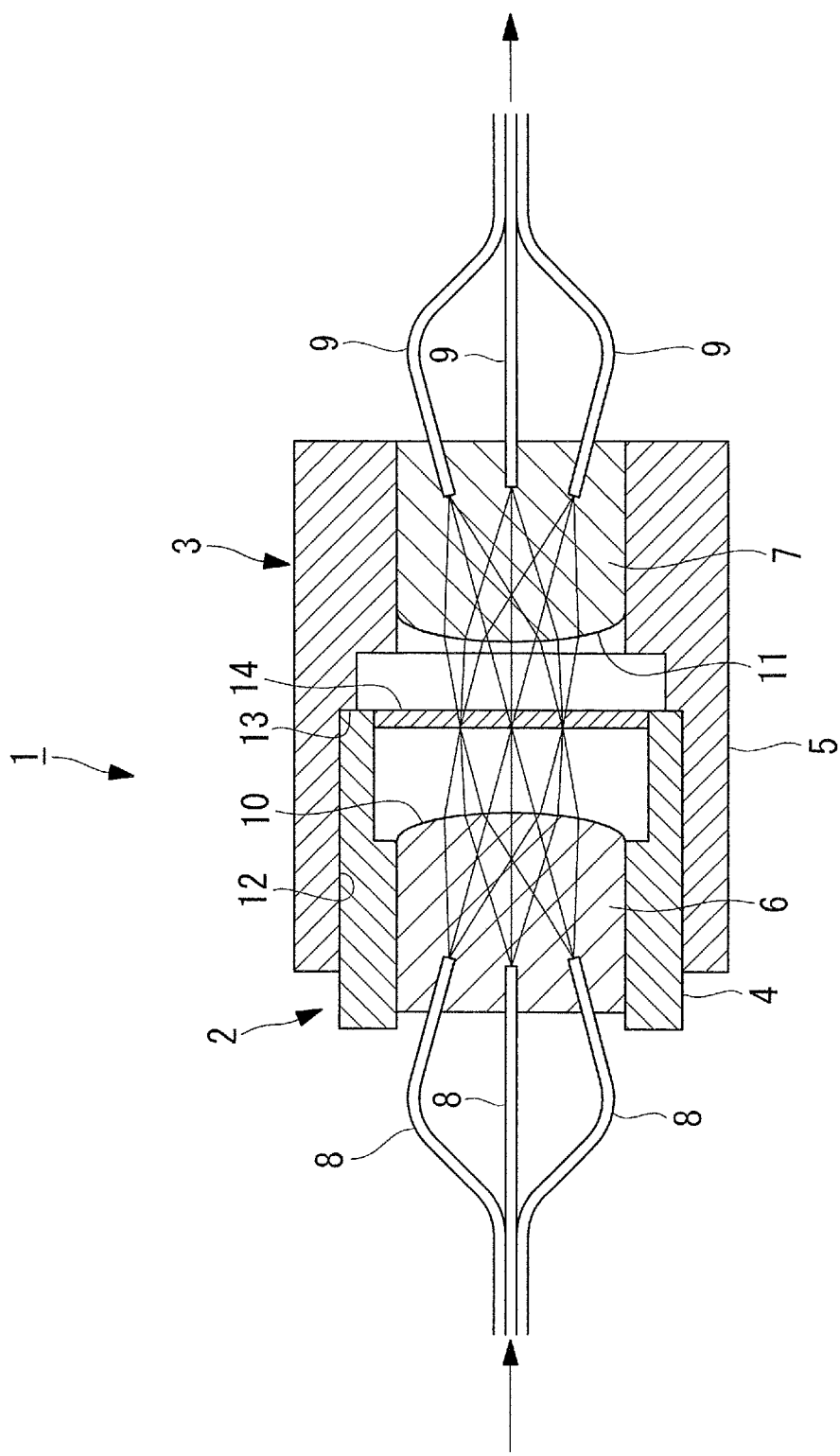
FIG. 4 is a longitudinal sectional view showing optical signals overlaid on the optical transmission connector device shown in FIG. 3.

In the transmission-side connector 2, as shown in FIG. 4, the respective optical fibers 8 are disposed such that the centers of the light beams emitted from one end surfaces of the optical fibers 8 are made to intersect at one point (exit pupil) after being emitted from the lens 6.

Specifically, the optical fibers 8 are disposed so as to satisfy the following conditional expression (1).

Specifically, when the maximum effective diameter of the lens 6 of the transmission-side connector 2 is set to D1, and the maximum light-beam diameter at the position of the exit pupil of the light emitted from the lens 6 is set to D2, the conditional expression will be as follows.

$$D1/D2<2 \qquad (1)$$

Figure 5:
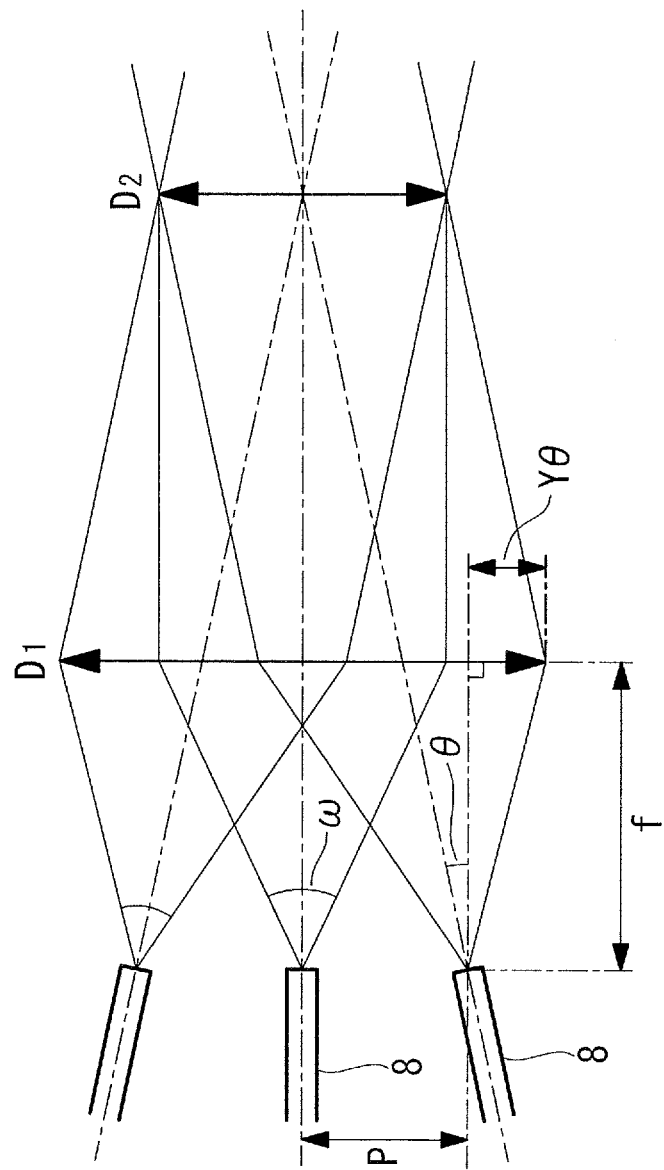
FIG. 5 is a view showing, in outline, a case in which optical signals enter the lens of the transmission-side connector shown in FIG. 4, while being tilted by θ with respect to the optical axis.

More specifically, in FIG. 5, the maximum light-beam diameter D2 is expressed by:

$$D2=2f\tan(\omega/2).$$

From the above expression and expression (1), the following conditional expression (2) can be derived;

$$D1/2f\tan(\omega/2)<2 \qquad (2)$$

where ω is a divergence angle of signal light from each of the optical fibers 8, and f is the focal length of the lens 6.

Furthermore, the maximum effective diameter D1 is expressed by:

$$D1=2\{P+f\tan(\omega/2-\theta)\}.$$

Therefore, from the above expression and expression (2), the following conditional expression (3) can be derived;

$$2\{P+f\tan(\omega/2-\theta)\}/2f\tan(\omega/2)<2 \qquad (3)$$

where P is the distance between the optical axis and each optical fiber 8, and θ is a tilt angle of the optical fiber 8.

In the reception-side connector 3, the respective optical fibers 9 are disposed such that approximately parallel beams of light that have the centers of the light beams intersecting at one point (entrance pupil) outside the convex surface 11 are converged when entering the lens 7 from the convex surface 11 and are focused on one end surfaces of the optical fibers 9. In this case, conditional expression (2) is also satisfied. In the figure, reference numeral 14 denotes a protective cover that protects the lens 6 of the transmission-side connector 2.

Then, the housings 4 and 5 of the transmission-side connector 2 and the reception-side connector 3 are coupled, thereby aligning the exit pupil of the transmission-side connector 2 and the entrance pupil of the reception-side connector 3.

The operation of the thus-configured optical transmission connector device 1 of this embodiment will now be described.

In order to connect optical signals by using the optical transmission connector device 1 of this embodiment, the housing 4 of the transmission-side connector 2 and the housing 5 of the reception-side connector 3 are coupled. Accordingly, the exit pupil of the transmission-side connector 2 and the entrance pupil of the reception-side connector 3 are aligned.

In this state, optical signals are guided via the optical fibers 8 of the transmission-side connector 2. Although the optical signals guided inside the optical fibers 8 spread when emitted from one end surfaces thereof, because the one end surfaces of the optical fibers 8 are brought into close contact with the lens 6 with no gaps therebetween, in this embodiment, the light beams thereof propagate in the lens 6 without widely spreading and are focused by the power of the convex surface 10 of the lens 6, thereby being converted into approximately parallel beams of light and being emitted.

The centers of the light beams of the plurality of optical signals, which are formed of the approximately parallel beams of light, emitted from the lens 6 pass through one point at the exit pupil, then spread again, and enter the convex surface 11 of the lens 7 of the reception-side connector 3.

The plurality of optical signals entering the convex surface 11 of the lens 7 of the reception-side connector 3 are respectively focused by the power of the convex surface 11 of the lens 7, thereby being made to separately enter one end surfaces of the plurality of optical fibers 9, which are fixed to the lens 7.

Accordingly, the optical signals guided via the plurality of optical fibers 8 of the transmission-side connector 2 can be made to enter the plurality of optical fibers 9 of the reception-side connector 3, thus making it possible to easily connect the plurality of optical signals.

In this case, according to the optical transmission connector device 1 of this embodiment, because the end surfaces of the respective optical fibers 8 are brought into close contact with the lens 6, the light-beam diameters of the optical signals formed of approximately parallel beams of light emitted from the lens 6 can be sufficiently reduced.

In this way, according to the optical transmission connector device 1 of this embodiment, there is an advantage that, even when a plurality of optical signals are connected, it is possible to use the single lenses 6 and 7 at the transmission side and the reception side, respectively, without using large-scale optical components, such as lens arrays, thereby making it possible to suppress the maximum diameter dimensions of the lenses 6 and 7 to achieve a reduction in size and diameter.

The light emitted from the lens 6 is formed into parallel beams of light, thereby making it possible to broaden the allowable range of error in the optical-axis direction. Specifically, there is an advantage that the degree of freedom in arrangement of the transmission-side connector 2 and the reception-side connector 3 is increased, and the tolerance to errors that occur at the time of assembly of the optical transmission connector device 1 is excellent.

When the optical transmission connector device 1 is used in an endoscope system, there is an advantage that various scopes can be easily switched, connected to an image processing device, and cleaned after use and that, because the lens 6 is disposed at the distal ends of the optical fibers 8 to expand the light-beam diameters of the optical signals so as to form them into approximately parallel beams of light, optical signals can be connected without reducing the transmission efficiency even if water stains and a foreign matter adhere to the lens 6. Furthermore, because the optical fibers 8 and 9 and the lenses 6 and 7 are brought into close contact, respectively, a foreign matter does not enter therebetween, thus preventing a reduction in transmission efficiency caused by the entrance of a foreign matter.

Note that, in the optical transmission connector device 1 of this embodiment, although an example case in which the five optical fibers 8 and 9 are respectively provided has been illustrated, instead of this, it is also possible to provide any number of optical fibers 8 and 9 equal to two or more.

Next, an optical transmission connector device 15 according to a second embodiment of the present invention will be described below with reference to the drawings.

In the description of this embodiment, identical reference signs are assigned to components having configurations common to those in the optical transmission connector device 1 of the above-described first embodiment, and a description thereof will be omitted.

As shown in FIG. 6, the optical transmission connector device 15 of this embodiment differs from the optical transmission connector device 1 of the first embodiment in that lenses 16 and 17 are formed of plano-convex lenses that have the convex surfaces 10 and 11 and flat surfaces 18 and 19, and in that one end surfaces of the optical fibers 8 and 9 and the flat surfaces 18 and 19 of the lenses 16 and 17 are respectively disposed opposing each other with minute gaps therebetween.

According to the thus-configured optical transmission connector device 15 of this embodiment, although optical signals guided by the optical fibers 8 spread at large divergence angles when emitted from the one end surfaces of the optical fibers 8, because the optical signals immediately enter the flat surface 18 of the lens 16, which is disposed opposing the one end surfaces of the optical fibers 8 with minute gaps therebetween, the light-beam diameters of signal light beams, formed of approximately parallel beams of light, to be emitted from the convex surface 10 of the lens 16 can be prevented from being increased much, and the above-described conditional expression (3) can be satisfied.

Specifically, according to this embodiment, there is also an advantage that it is possible to use the single lenses 16 and 17 at the transmission side and the reception side, respectively, without using large-scale optical components, such as lens arrays, thereby making it possible to suppress the maximum diameter dimensions of the lenses 16 and 17 to achieve a reduction in size and diameter.

Note that, in this embodiment, as in the optical transmission connector device 1 of the first embodiment, it is also possible to adjust the tilts of the plurality of optical fibers 8 such that the centers of light beams of a plurality of signal light beams, formed of approximately parallel beams of light, emitted from the lens 16 intersect at one point, as shown in FIG. 6, or it is also possible to adjust the angles of the one end surfaces of the optical fibers 8 with respect to the longitudinal axes thereof such that the centers of light beams of a plurality of signal light beams, formed of approximately parallel beams of light, emitted from the lens 16 intersect at one point, as shown in FIG. 7.

As a result, the above-described embodiments lead to the following aspect.

The present invention provides an optical transmission connector device including: a transmission-side connector that sends a plurality of optical signals; and a reception-side connector that receives the plurality of optical signals sent from the transmission-side connector, wherein the transmission-side connector and the reception-side connector each have: a plurality of optical fibers that transmit the optical signals; and an optical member that is disposed in contact with or in the vicinity of one end surfaces of the plurality of optical fibers; the optical member of the transmission-side connector is formed so as to convert the plurality of optical signals emitted from the one end surfaces of the optical fibers into approximately parallel beams of light and so as to cause the centers of light beams of the approximately parallel beams of light to intersect at approximately one point; the optical member of the reception-side connector is formed so as to cause the plurality of optical signals converted into approximately parallel beams of light at the optical member of the transmission-side connector to enter the separate optical fibers; and the following conditional expression (1) is satisfied;

$$D1/D2<2 \qquad (1)$$

where D1 is the maximum effective diameter of the optical member of the transmission-side connector, and D2 is the maximum light-beam diameter of the parallel light.

According to the present invention, a plurality of optical signals guided via the plurality of optical fibers of the transmission-side connector are emitted from one end surfaces of the optical fibers, then enter the optical member disposed in contact with the one end surfaces, are converted into approximately parallel beams of light, and are emitted. An optical member that is formed of a material having the same degree of a refractive index as those of the optical fibers can be selected as the optical member, and optical signals emitted from the one end surfaces of the optical fibers propagate in the optical member without widely spreading and are emitted in the form of relatively-thin approximately parallel beams of light.

Because the centers of light beams of the signal light beams emitted from the optical member in the form of approximately parallel beams of light are made to intersect at approximately one point, after the pupils of the plurality of signal light beams are shared, they are focused, by the optical member of the reception-side connector, on the one end surfaces of the optical fibers of the reception-side connector, and are received by the reception-side connector. Accordingly, it is possible to reduce the light-beam diameters of the optical signals and to reduce the optical member in size, specifically, to configure the optical member so as to be smaller than twice the maximum light-beam diameter of the signal light, thus making it possible to achieve a size reduction.

In the above-described aspect, it is preferred that the following conditional expression (2) be satisfied:

$$D1/2f\tan(\omega/2)<2 \qquad (2)$$

Here, $\omega$ is a divergence angle of the signal light from the optical fibers, and f is the focal length of the optical member.

In this way, light emitted from the optical member is formed into parallel light, thus making it possible to further allow an error in the optical-axis direction. Specifically, the degree of freedom in arrangement of the transmission-side connector and the reception-side connector is increased, and tolerance to errors that occur at the time of assembly of the optical transmission connector device is excellent.

In the above-described aspect, it is preferred that the following conditional expression (3) be satisfied;

$$2\{P+f\tan(\omega/2-\theta)\}/2f\tan(\omega/2)<2 \qquad (3)$$

where P is the distance between the optical axis and each of the optical fibers, and $\theta$ is a tilt angle of the optical fiber.

Accordingly, although a plurality of optical signals guided via the plurality of optical fibers of the transmission-side connector spread at relatively wide angles when emitted from the one end surfaces of the optical fibers, the optical fibers are disposed at positions and angles for satisfying the above-described expression (3), thereby making it possible to further reduce the light-beam diameters of the optical signals.

Furthermore, in a case in which optical signals are made to enter the optical member that is disposed opposing the one end surfaces with minute gaps therebetween, the divergence angles of the optical signals are suppressed, and the optical signals propagate in the optical member and are emitted in the form of relatively-thin approximately parallel beams of light.

In the above-described aspect, the optical members may each have a convex surface; the convex surface may have an aspheric surface shape in which power is weakened from the center toward the periphery thereof; and the optical member of the reception-side connector and the optical member of the transmission-side connector may be disposed with the convex surfaces thereof opposing each other.

By doing so, in the transmission-side connector, the aberrations of signal light beams passing though the optical member are corrected to form the signal light beams formed of approximately parallel beams of light whose the light-beam centers intersect at one point, and, in the reception-side connector, the aberrations of signal light beams passing through the optical member are corrected to cause the signal light beams formed of approximately parallel beams of light to correctly enter the one end surfaces of the optical fibers.

According to the present invention, an advantageous effect is afforded in that a further size reduction can be achieved while improving the transmission efficiency.

REFERENCE SIGNS LIST 1, 15 optical transmission connector device
2 transmission-side connector
3 reception-type connector
6, 7, 16, 17 lens (optical member)
8, 9 optical fiber
10, 11 convex surface

The invention claimed is:
1. An optical transmission connector device comprising:
a transmission-side connector that sends a plurality of optical signals; and
a reception-side connector that receives the plurality of optical signals sent from the transmission-side connector,
wherein the transmission-side connector and the reception-side connector each have: a plurality of optical fibers that transmit the optical signals; and an optical member that is disposed in contact with or in the vicinity of one end surfaces of the plurality of optical fibers;
the optical member of the transmission-side connector is formed so as to convert the plurality of optical signals emitted from the one end surfaces of the optical fibers into approximately parallel beams of light and so as to cause the centers of light beams of the approximately parallel beams of light to intersect at approximately one point;
the optical member of the reception-side connector is formed so as to cause the plurality of optical signals converted into approximately parallel beams of light at the optical member of the transmission-side connector to enter the separate optical fibers;
at least one of the plurality of optical fibers are tilted with respect to an optical axis; and
the following conditional expressions (1), (2), and (3) are satisfied;

$$D1/D2<2 \qquad (1)$$

$$D1/2f\tan(\omega/2)<2 \qquad (2)$$

$$2\{P+f\tan(\omega/2-\theta)\}/2f\tan(\omega/2)<2 \qquad (3)$$

where D1 is the maximum effective diameter of the optical member of the transmission-side connector, D2 is the maximum light-beam diameter of the parallel light, $\omega$ is a divergence angle of the signal light from the optical fibers, f is the focal length of the optical member, P is the distance between the optical axis and each of the optical fibers, and $\theta$ is a tilt angle of the optical fiber.

* * * * *